Patented May 1, 1934

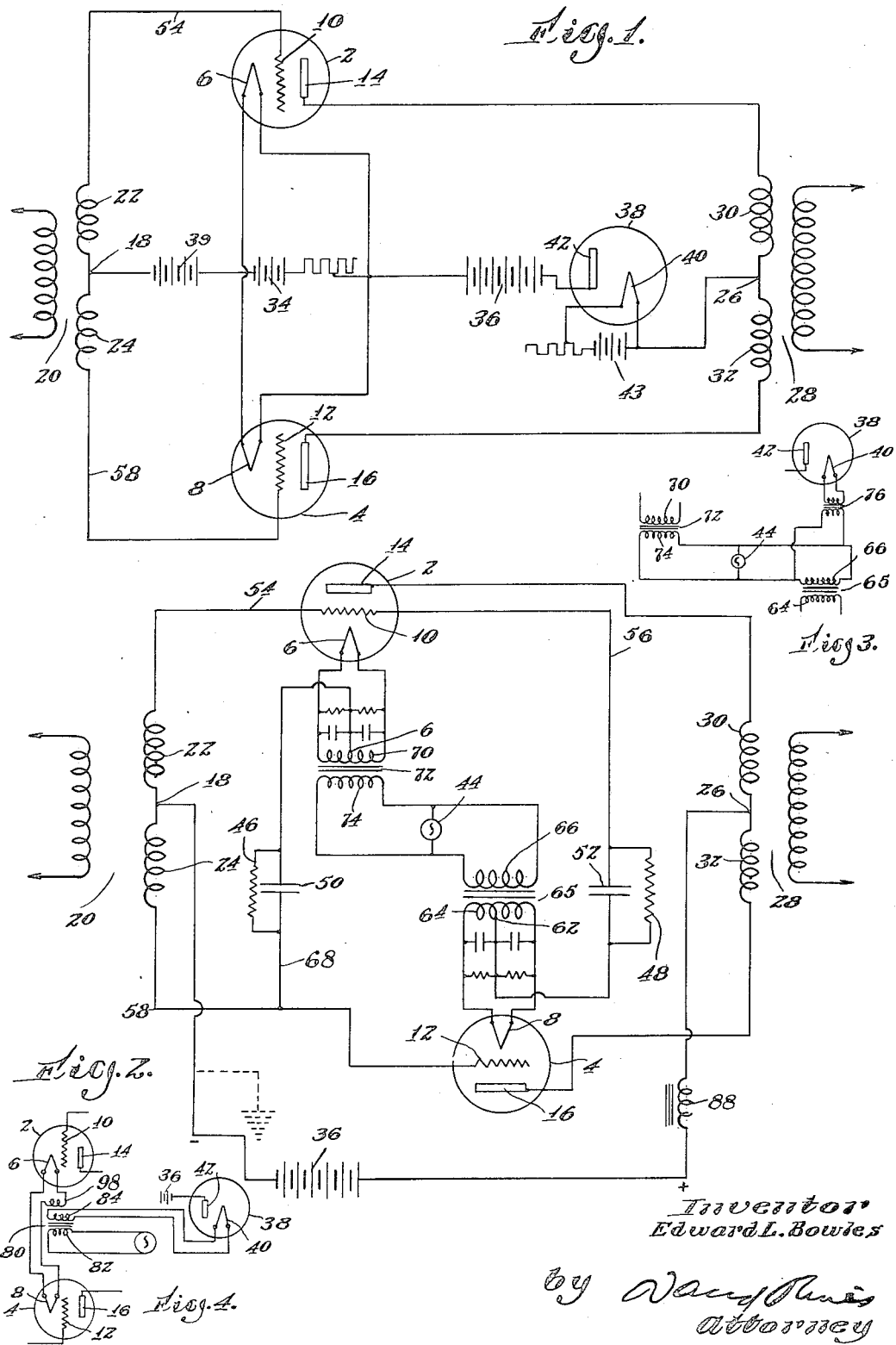

1,957,093

UNITED STATES PATENT OFFICE 1,957,093

ELECTRIC SYSTEM

Edward L. Bowles, Wellesley Farms, Mass.

Application February 26, 1930, Serial No. 431,525

27 Claims. (Cl. 179—171)

The present invention relates to electric systems, and more particularly to systems employing electric-wave repeaters, especially those operating on the space-current principle, like tubes. Repeaters of the above-described character are usually provided with three electrodes, namely, a heated filament or cathode, constituting a source of ions, a grid, and an anode or plate. The filament and the grid are connected, preferably in series with the secondary winding of an input repeating transformer, in the input circuit of the repeater. The filament and the plate are similarly connected in series with a B battery or other source of energy, and preferably also with the primary winding of an output repeating transformer or other output impedance, in the output circuit of the repeater. Electric energy, flowing in the form of an ionized stream or current, from the filament to the grid in the input circuit, is repeated and amplified in the output circuit. The term "ionized stream" will be employed herein in a broad sense, to include also thermionic currents. Such amplification is often accompanied by undesired plate distortion of the tube characteristics. This distortion is caused largely by the uni-directional nature of the flow of the ionized stream or current, notwithstanding the alternating nature of the current in the input circuit, and results in the introduction of overtones or harmonics in the current in the output circuit of the device. In order to reduce this distortion in the output of the amplifier, a balanced circuit arrangement has been employed, involving two vacuum tubes, so arranged that as the voltage on one of the control elements or grids is increasing, the voltage of the other control element is decreasing. Owing to non-linearity, the increase of plate current in one tube does not necessarily equal the decrease in the case of the other tube. As the grid voltage on one tube is increased its plate current is increased and, at the same time, the grid voltage on the other tube is decreased as its plate current is decreased. The input and the output circuits of the two vacuum tubes are symmetrically divided in such a way as to bring about this result:—The filaments are connected together with the mid-point of the input-repeating secondary winding; the grids, properly biased, are connected together through the input repeating secondary winding to the point of junction of the filaments; and the plates and the filaments are connected in circuit with the same B battery, the latter being connected with the mid-point of the primary winding of the output repeating winding, or with the centre portion of such other output impedance as may be employed. The even overtones are eliminated from the output by such a symmetrical arrangement. For example, a second-overtone distortion present in the output of one of the tubes, when operating with a given amplitude of grid voltage, given loads, and so on disappears from the output when a similar tube is symmetrically connected into circuit therewith as above described. Two tubes, thus connected together, would therefore produce a greater linear output than the same distortion with the tubes connected in parallel.

When the tubes are so connected together, however, the grid voltage of one tube is decreased when that of the other is increased, and conversely; that is, when the positive voltage of one tube is increased, the negative voltage of the other tube is correspondingly increased. The plate or output current of one tube consequently tends to increase when that of the other tube is decreased, and vice versa. If the plate-voltage-plate-current characteristic of the tubes were linear and identical, the current increase in the one tube and the current decrease in the other tube would be exactly equal, and the current of the B battery would be the same irrespective of the changes in the grid voltage. This voltage-current characteristic is not, however, linear, with the result that changes in the alternating voltages impressed upon the grids by means of the input transformers demand a variable current from the B battery.

It is often desirable that the sum of the output currents of the two tubes be maintained constant. Under such conditions, if there were a tendency for the output current of one of the tubes, for example, to increase at any instant, to correspond to a positive bias or alternating voltage on its grid, there would be a corresponding tendency for the output current of the other tube to decrease by precisely the same amount for the same negative voltage applied to the grid of the said other tube.

Among the proposals heretofore suggested for bringing about this result is the employment of a common choke coil or resistor in series with the B battery. As the grid voltages are measured with respect to the filaments, it was theoretically supposed that the choke coil or the resistor would resist any tendency to change in the current demanded from the B battery.

The degree of constancy thus obtained, however, is a function of the attempted rate of change of the current through the choke coil and has no relation to the actual magnitude of the change.

The choke coil might reduce the distortion arising out of alternating grid-voltage amplitudes caused by large signals, involving rapid rates of change in grid voltage. If the rate of change in grid voltage is relatively small, however, the choke coil may not offer enough opposition to maintain the current of the B battery constant. A high resistor, on the other hand, though having no effect against rate of change of current, would function only in terms of the actual amplitudes of the current.

An object of the present invention, therefore, is to provide a new and improved system of the above-described character that shall be efficient in operation and simple in arrangement.

With the above end in view, a feature of the invention resides in the use of a two-electrode, current-limiting thermionic tube in series with the B battery, operating the tube upon the straight, horizontal portion of its plate voltage-plate current characteristic.

A further object is to energize the filaments of the tubes by means of alternating current. Still another object is to insulate the filaments from each other. Other objects will be explained hereinafter and will be particularly pointed out in the appended claims.

The invention will now be explained in connection with the accompanying drawing, in which Fig. 1 is a diagrammatic view of circuits and apparatus constructed and arranged according to a preferred embodiment of the present invention; and Figs. 2, 3 and 4 are similar views of modifications.

The repeater tubes 2 and 4, having filaments 6 and 8, grids 10 and 12 and plates 14 and 16, respectively, are shown arranged in opposition, connected in push-pull arrangement. The input circuit of the combined arrangement is divided at the mid-point 18 of the secondary winding of the signal input-coil repeater transformer 20, so as, in Fig. 1, to leave a portion 22 in the input circuit of the tube 2 and a portion 24 in the input circuit of the tube 4; and the output circuit of the combined arrangement is divided at the mid-point 26 of the primary winding of the signal output repeater transformer 28, so as, in Fig. 1, to leave a portion 30 in the output circuit of the tube 2 and a portion 32 in the output circuit of the tube 4. The purpose of the division points 18 and 26 is different in Fig. 2, as will presently be explained. The filaments 6 and 8 are provided with a common source of energization, shown in Fig. 1 as an energizing battery 34 and in Fig. 2 as a source of alternating-current energy 44. The B battery is indicated at 36, but it may be replaced, particularly in Fig. 2, by any other desired source of plate supply. A common biasing battery is indicated in Fig. 1 at 29. In Fig. 2, separate grid-biasing resistors 46 and 48 and by-pass condensers 50 and 52 are shown provided for each tube. A vacuum tube 38 is, in Fig. 1, connected between the battery 36 and the point 26, and is provided with a filament 40 and a plate 42. The filament 40 has an energizing battery 43. The same vacuum tube 38 may be employed in Fig. 2, but it may, for some purposes, in that figure, be replaced by the ordinary resistor or choke coil 88.

To any given adjustment of the battery 43 corresponds a predetermined electron emission from the filament 40. The output current of the tubes 2 and 4 corresponding to this emission may vary with variation of the B battery 36. The current-voltage curve (current ordinate-voltage abscissa) of the tube 38 has a horizontal straight-line portion for values above a predetermined voltage; that is, above the voltage-saturation point, the current is maintained constant irrespective of the voltage on the plate 42. If the B battery 36 is so adjusted as to restrict operation to this straight-line horizontal portion of the curve, therefore, the sum of the output currents of the tubes 2 and 4 will be constrained to remain constant irrespective of the voltage changes or rates of such changes on the grids 10 and 12. Such voltage changes on the grids 10 and 12 can not affect the behavior of the tube 38 so long as the voltage of the battery 36 is large enough to force the tube 38 to operate upon the horizontal, straight-line portion of its characteristic curve. This result could not be obtained with a resistor or a choke coil except, theoretically, if the choke coil were of infinite impedance.

It follows from the above analysis that even with direct-voltage increments applied to the grid-filament terminals so that as one grid voltage is increased by a given increment and the other reduced by this same incremental value, the current in the common lead containing the element 38 must remain constant. Obviously, this condition could not hold were a choke connected in the common lead in place of the tube 38.

According to the modification of Fig. 2, which may be embodied also in Fig. 1, the grids are each subjected to the full input-transformer voltage. This is effected by connecting the portion 22 of the secondary winding of the transformer 20, by conductors 54 and 56, to the grid 10 and the filament 8, and the portion 24, by conductors 58 and 60, to the grid 12 and the filament 6. During a given instant, the voltage is increasing on one of the grids, say the grid 10, with respect to its filament 6, and is decreasing on the other grid 12, with respect to the filament 8. For the same transformer, twice the grid-filament voltage that is obtainable in Fig. 1 per tube is thus available with the system of Fig. 2. The grid bias of each tube is, nevertheless, obtained by means of its own plate current, as shown, by means of its own grid-biasing resistor 46 or 48. The mid-point taps 18 and 26 are utilized merely for the purpose of connecting to the B battery or other plate-current source 36.

The filaments 6 and 8 may be insulated from each other, with respect to audio or radio-frequency energy exchanges, as is also shown in Fig. 2, and this arrangement, too, may be embodied in Fig. 1. The filaments are shown heated by alternating current from the same alternating-current source 44. The conductor 56 leads to a mid-point tap 62 of the secondary winding 64 of a filament-heating transformer 65, the primary winding 66 of which is connected in circuit with the alternating-current source 44. The conductor 60, similarly, leads to a mid-point tap 68 of the secondary winding 70 of a filament-heating transformer 72, the primary winding 74 of which is connected in circuit with the same alternating-current source 44.

In Fig. 1, likewise, the filament-heating batteries 34 and 43 may be replaced by individual filament heating transformers 72, 65 and 76, operating from the same or different sources, as illustrated in the modification of Fig. 3. Also, as in Fig. 4, the tubes 2 and 4 may have their filaments heated from one winding 98 of a power transformer 80 the primary winding of which is shown at 82, and the filament of tube 38 may be heated from another winding 84 and the same transformer 80, thus obviating the need of duplicate filament-heating batteries. A single transformer is thus provided, having two secondary windings, one for heating the filaments 6 and 8 and the other for heating the filament 40.

Further modifications will occur to persons skilled in the art and all such are considered to fall within the spirit and scope of the invention as defined in the appended claims.

What is claimed is:

1. An electric-wave repeating apparatus comprising divided input and divided output circuits, means for producing two ionized streams, said streams being oppositely included in said output circuit, two electrodes for controlling said ionized streams respectively and oppositely connected in said input circuit, and means for maintaining the sum of the streams constant over a frequency range from zero to very large values.

2. An electric-wave repeating apparatus comprising divided input and divided output circuits, means for producing an ionized stream included in each division of said output circuit, electrodes, one in each division of said input circuit, for controlling said ionized streams respectively, and a two-electrode, space-discharge device for maintaining the sum of the streams constant irrespective of the rates of change of the voltage of the electrodes.

3. An electric-wave repeating apparatus comprising input and output circuits, two vacuum-discharge repeater elements oppositely connected in said circuits, whereby the positive and negative portions of electric waves in said input circuit are repeated by said repeater elements respectively in said output circuit, and means for maintaining the sum of the said portions of the electric waves constant over a frequency range from zero to very large values.

4. In an electric-wave repeating apparatus, the combination with input and output circuits, of two vacuum-discharge repeater elements oppositely connected in said circuits, whereby one of said elements is adapted to repeat certain parts, and the other, the remaining parts of said input waves, and a two-electrode space-discharge device for maintaining the sum of the said portions of the electric waves constant irrespective of the rates of change of the voltage on the electrodes.

5. In an electric-wave repeating apparatus, the combination of two repeating elements each comprising an input circuit, an output circuit and ionizing means, an anode in the output circuit and an input electrode in the input circuit of each element, an input repeating transformer the secondary winding of which is connected at an intermediate point to said ionizing means and at its opposite terminals to said input electrodes respectively, and means for maintaining the sum of the output currents constant over a frequency range from zero to very large values.

6. In an electric-wave repeating apparatus, the combination, of two repeating elements comprising ionizing means, an anode and an input electrode for each said element, an input repeating transformer and an output repeating transformer, the secondary winding of said input repeating transformer being divided and the divisions connected to said input electrodes respectively, and the primary winding of said output repeating transformer being divided and the divisions connected to said repeating elements respectively, and means for maintaining the sum of the output currents constant over a frequency range from zero to very large values.

7. In an electric-wave repeating apparatus, the combination with input and output circuits and a repeating transformer in each of said circuits, of two repeating elements together comprising a common source of ionization, an anode for each of said elements, and two input electrodes, said source of ionization being connected to an intermediate point in the secondary winding of the input repeating transformer and also to an intermediate point in the primary winding of the output repeating transformer, the opposite terminals of said secondary winding being connected to said input electrodes respectively, and the opposite terminals of said primary winding being connected to said anodes respectively, and a two-electrode space-discharge device connected between the source of ionization and the said intermediate point of the primary winding of the output repeating transformer.

8. In combination with a source of power, space-discharge apparatus having divided input and divided output circuits, means for producing an ionized stream included in each division of said output circuit, a connection of said input circuit to said source of power and a two-electrode space-discharge device connected between the points of division of said divided circuits.

9. An electric system comprising thermionic apparatus with divided input and divided output circuits, means for producing an ionized stream included in each division of said output circuit, and a two-electrode space-discharge device connected in the output circuit of said apparatus.

10. An electric system comprising a plurality of evacuated vessels each including a unilaterally conductive space, an impedance-controlling element for said space, said spaces being connected in opposition in a circuit and having a common path, a two-electrode space-discharge device and a source of constant electromotive force in said path, said elements being supplied with current in multiple through said path, and auxiliary electrodes for varying said currents in response to an impressed voltage.

11. An electric system comprising two electron discharge devices, each of said devices including an impedance-controlling element, individual input circuits and individual output circuits for said devices, a portion of each of the similar circuits of said devices being in common, and a two-electrode space-discharge device in the said common portion.

12. An amplifier comprising two electrical discharge devices, input and output circuits therefor, said devices being symmetrically and oppositely disposed with respect to each of said circuits, space-current paths for said devices, said paths having a common external portion, and a two-electrode discharge device connected in the common portion for maintaining the sum of the currents in the said circuits constant.

13. An amplifier comprising two electrical discharge devices, input and output circuits therefor, said devices being symmetrically and oppositely arranged with respect to each of said circuits, space-current paths for said devices, a source of space current therefor, said paths having a common external portion, and a two-electrode discharge device associated with said source for maintaining the sum of the currents through said circuits constant.

14. A repeater comprising two electric discharge devices each having a cathode, an anode and an impedance-varying element, a connection between said impedance-varying elements a connection between said cathodes, a connection between said anodes, an electrical impedance in one of said connections, an electrical impedance in another of said connections, other connections from intermediate portions of each of said impedances to one of said first-mentioned connections, one of said last-named connections being provided with a source of current, and means for maintaining a constant supply from said source irrespective of the rates of change of the voltage of the impedance-varying elements.

15. In a repeater, two oppositely disposed electric discharge devices, impedance-varying elements for said devices, means for causing one of said elements to increase the impedance of one of said devices, and the other of said elements to decrease the impedance of the other of said devices simultaneously, and a two-electrode discharge device for causing the changes of current through said devices to be simultaneously substantially equal and opposite respectively when said repeater is repeating alternating current.

16. In an electric-wave repeating apparatus, the combination of two repeating elements each comprising an input circuit, an output circuit and ionizing means, an anode in the output circuit and an input electrode in the input circuit of each element, and an input source of energy one end of which is connected with an input electrode and the other end of which is connected with an ionizing means, and a two-electrode, space-discharge device in the divided output circuit.

17. In an electric-wave repeating apparatus, the combination of two repeating elements each comprising an input circuit, an output circuit and ionizing means, an anode in the output circuit and an input electrode in the input circuit of each element, a source of alternating-current energy, and two transformers each having a primary winding in series with the source and a secondary winding, one of the secondary windings being connected with the ionizing means of one element and the input electrode of the said one element, and the other secondary winding being connected with the ionizing means of the said other element and the input electrode of the said other element, and a two-electrode, space-discharge device in the divided output circuit.

18. An electric system comprising a thermionic repeater with divided input and divided output circuits and a two-electrode, unilateral space-change device connected in the output circuit of said repeater, said repeater having its cathode or cathodes heated from one winding and said two-electrode tube having its cathode heated from another winding of the same power transformer.

19. An electric-wave repeating apparatus comprising divided input and divided output circuits, means for producing two ionized streams, said streams being oppositely included in said output circuit, two electrodes for controlling said ionized streams respectively and oppositely connected in said input circuit, a common source of current for the streams, and means for maintaining the source current constant over a frequency range from zero to very large values.

20. An amplifier comprising two electron discharge devices, an electron-emitting cathode and an anode for said devices, space-current circuits for said devices, said circuits having a common portion and individual portions, a common source of energy for the cathodes, and means for maintaining the source current constant over a frequency range from zero to very large values.

21. In combination, two electron-discharge devices each having an electron-emitting cathode, an anode and a control electrode, and each having a space-current path, said paths being similarly connected to said source, a space-current device for maintaining the sum of the space currents through said first-named devices constant, the third-named space-current device having a cathode and an anode, and a common source of energy for the cathodes.

22. In an electric-wave repeating apparatus, the combination of two repeating elements each comprising an input circuit, an output circuit and ionizing means, an anode in the output circuit and an input electrode in the input circuit of each element, a space-current device for maintaining the sum of the space-current devices through the repeating elements constant, the space-current device having ionizing means, a source of alternating-current energy, and three transformers each having a primary winding in series with the source and a secondary winding, one of the secondary windings being connected with the ionizing means of one element and the input electrode of the said one element, the other secondary winding being connected with the ionizing means of the said other element and the input electrode of the said other element, and the third secondary winding being connected with the ionizing means of the space-current device.

23. In an electric-wave repeating apparatus, the combination of two repeating elements each comprising an input circuit, an output circuit and ionizing means, an anode in the output circuit and an input electrode in the input circuit of each element, a space-current device for maintaining the source of the space-current devices through the repeating elements constant, the space-current device having ionizing means, a source of alternating-current energy, and a transformer having a primary winding in series with the source and two secondary windings, one of the secondary windings being connected with the ionizing means of the elements, and the other secondary winding being connected with the ionizing means of the space-current device.

24. An electric-wave repeating apparatus comprising a divided output circuit having a common branch and two separate branches, and means for maintaining the current constant in the common branch over a frequency range from zero to very large values.

25. An electric system comprising two electron-discharge devices, each of said devices including a current-controlling element, individual input circuits and individual output circuits for said devices, a portion of each of the similar circuits of said devices being in common, and means for maintaining the current in the common portion constant over a frequency range from zero to very large values.

26. An electric-wave repeating apparatus comprising divided input and divided output circuits, means for producing an ionized stream included in each division of said output circuit, an electrode in one of the divisions of said input circuit for controlling the corresponding ionized stream, and means for maintaining the sum of the streams constant over a frequency range from zero to very large values.

27. An electric-wave repeating apparatus comprising divided input and divided output circuits, means for producing an ionized stream included in each division of said output circuit, an electrode in one of the divisions of said input circuit for controlling the corresponding ionized stream, and ionizing means for maintaining the sum of the streams constant over a frequency range from zero to very large values.

EDWARD L. BOWLES.